Patented Aug. 11, 1931

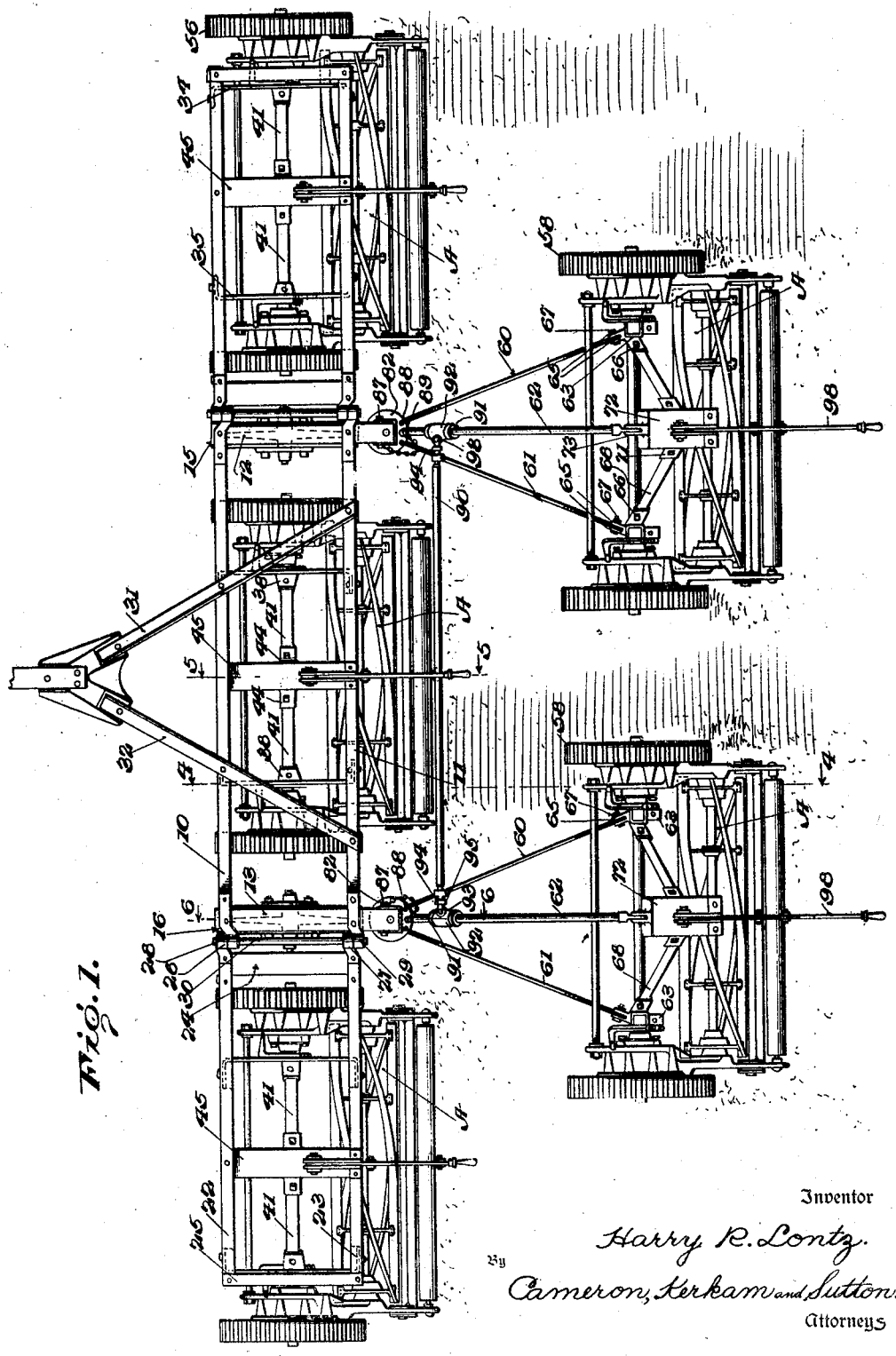

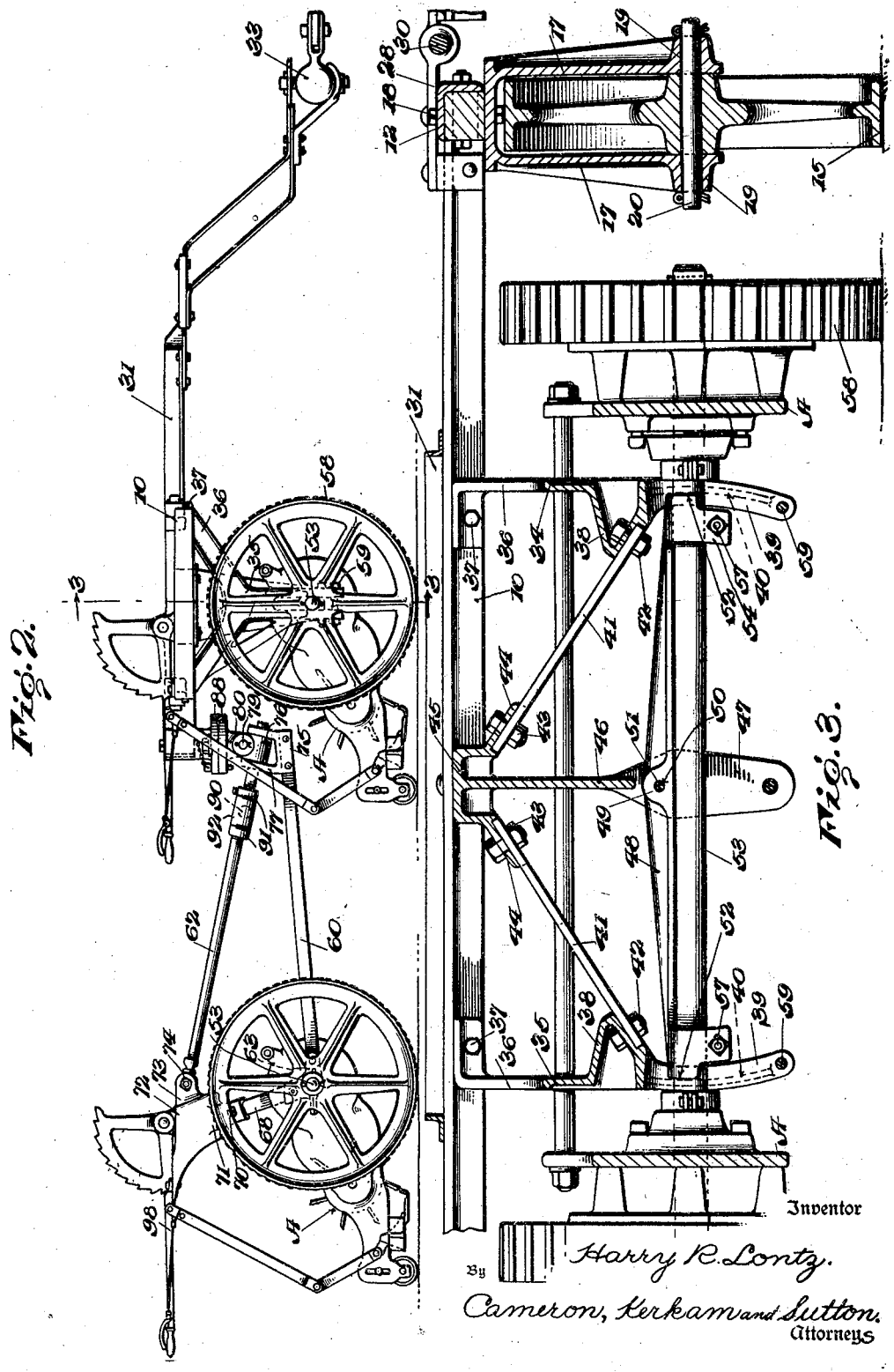

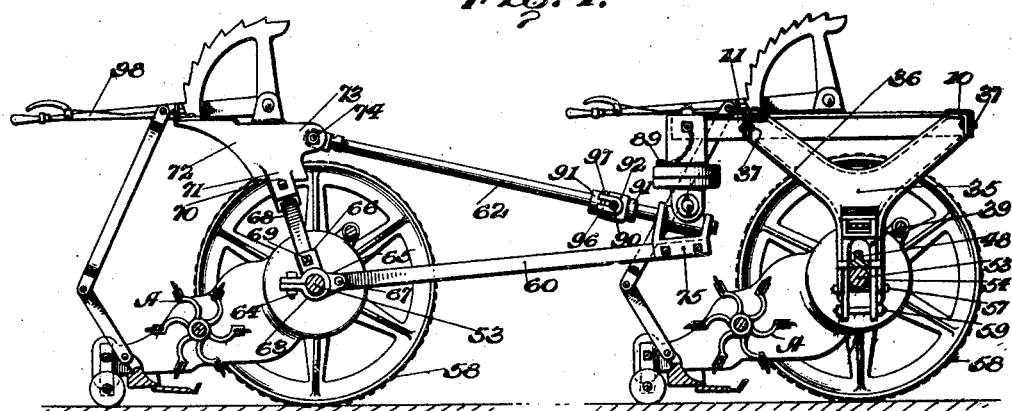

1,818,487

UNITED STATES PATENT OFFICE

HARRY R. LONTZ, OF RICHMOND, INDIANA, ASSIGNOR TO F. & N. LAWN MOWER COMPANY, OF RICHMOND, INDIANA, A CORPORATION OF INDIANA

GANG MOWER

Application filed February 6, 1929. Serial No. 337,947.

This invention relates to mowing machines, and more particularly to gang mowers.

One of the objects of the invention is to provide a gang mower having a plurality of mowing units disposed in transverse ranks or rows and provided with novel interconnecting and supporting means between the units whereby flexibility of the mower to conform to ground conditions and ease of steering are secured.

Another object is to provide a gang mower with novel means whereby the units are maintained in proper overlapping relation regardless of ground conditions but are permitted relatively free individual movement to follow the contour of the ground.

Another object is to provide a gang mower with novel means for towing a plurality of mowing units which means permits of relatively free individual movement of the towed units to conform to ground conditions while maintaining the towed units in properly spaced overlapping relation with respect to the front units.

A further object is to provide a gang mower with means whereby a plurality of mowing units are each towed through individual universal joint means but have correlated swinging movement in a horizontal plane with respect to the towing means, whereby proper overlapping with the front units is maintained and steering is facilitated.

A still further object is to provide a gang mower having a frame embodying a collapsible linkage system for towing a plurality of mowing units from a front frame.

A still further object is to provide a gang mower having a frame embodying a collapsible linkage system for towing a plurality of mowing units from a front frame, the joints between the link means constituting said system being of the universal type.

Another object is to provide a gang mower with novel means for articulating a mowing unit to a frame which is supported by ground engaging means.

Another object is to provide a novel structure for a gang mower having the above characteristics which is simple in construction and operation, economical to manufacture, and strong and durable.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In said drawings, Fig. 1 is a top plan view of a complete mower;

Fig. 2 is an end elevation of Fig. 1;

Fig. 3 is a detail showing means for supporting a mowing unit;

Fig. 4 is an elevation taken on the line 4—4 of Fig. 1;

Fig. 5 is a detail elevation taken on the line 5—5 of Fig. 1;

Fig. 6 is a detail elevation taken on the line 6—6 of Fig. 1;

Fig. 7 is a perspective view of a type of universal joint which may be employed;

Fig. 8 is a perspective view of a part of the means for connecting a mowing unit to the frame; and Fig. 9 is a detail plan of a part of Fig. 8 and associated elements.

Referring now to the drawings, wherein like reference numerals indicate like parts throughout the several views, the mower as shown is of the trailing type and includes a plurality of mowing units A which may be of any suitable type. The mowing units are preferably of the rotating cutting reel type, but the specific details of the units constitute no part of the present invention. In the form shown, five of said units are employed, three units constituting a front rank and two units a rear rank, but it is to be understood that the number and arrangement of the units as well as the specific details of construction thereof may be varied in accordance with the service for which the mower is designed.

The mowing units constituting the front rank are preferably adapted by means hereinafter described to be suitably connected to and moved by a front frame, which preferably comprises a center section and two end sections pivoted to the center section about horizontal axes. In the form shown, the center section comprises a pair of transversely extending angle irons or rails 10 and 11 rigidly connected at their ends by means of cross pieces 12 and 13 which project rearwardly of the iron or rail 11. The center section is preferably mounted on ground engaging wheels 15 and 16 (Figs. 3 and 6) in any suitable manner, as by means of brackets 17 secured to cross pieces 12 and 13 by means of bolts or rivets 18 and provided with bearings 19 for the axles 20 and 21 of wheels 15 and 16 respectively.

The two end sections of the frame being similar, a description of one end section will be sufficient for both. Said end sections each comprise a pair of parallel transversely extending angle irons or rails 22 and 23, rigidly connected together at their ends by means of cross pieces 24 and 25. Brackets 26 and 27 are secured to the inner ends of rails 22 and 23 respectively, said brackets each being offset somewhat to one side of their respective rails, and corresponding brackets 28 and 29 are secured to the ends of rails 10 and 11 respectively of the center section and are offset from the longitudinal axis thereof oppositely with respect to brackets 26 and 27. A pivot pin or rod 30 passes through brackets 26, 27, 28 and 29, so that the end sections are free to swing in a vertical plane on the ends of the center section. The articulate framework constituted by the center and two end sections above described is provided with any suitable means for pulling or propelling the same, and in the form shown, a pair of angularly disposed bars or rails 31 and 32 are secured to frame members 10 and 11 and carry any suitable type of universal joint 33 for hauling the mower.

Novel means are provided for articulating one of the mowing units to each of the center and two end sections of the frame, so that said units are mounted for limited pivotal movement in a vertical plane relative to the frame sections. Since the means employed for this purpose is the same for each frame section and mowing unit, a description of one such means will suffice for all. Referring particularly to Figs. 3, 4 and 5, right and left hand brackets 34 and 35 respectively depend from the center frame section, each of said brackets being provided with upwardly extending arms 36 which are connected to front and rear rails 10 and 11 in any suitable manner, as by means of bolts or rivets 37. Each of the brackets 34 and 35 is provided with an inwardly extending boss 38, and below bosses 38 said brackets are arcuately shaped as seen in Fig. 3 and are also forked or slotted, each arcuate arm 39 of each fork being provided with an external rib 40 (Fig. 9) for a purpose to be described. Brackets 34 and 35 are held rigidly in position by means of braces 41, each suitably secured at one end to one of the bosses 38 as by means of bolts 42 and at the other end by means of bolts 43 to one of a pair of ears 44 formed on a central head or casting 45 which extends between front and rear rails 10 and 11. Head 45 is provided with a depending plate or bracket 46, preferably cast integral therewith, said plate being formed at its lower end into a pair of spaced flat arms 47, as shown in Figs. 3 and 5.

A pull bar 48 (Fig. 8) is pivotally mounted between arms 47 in any suitable manner, said bar being preferably provided with a central boss 49 provided with an opening 50 for a pivot pin 51 carried in suitable holes in arms 47. Bar 48 is provided at each end with a pair of extending ears or lugs 52 adapted to embrace arms 39 of brackets 34 and 35 and to engage ribs 40 (Fig. 9). The end surfaces of lugs 52 and ribs 40 have suitable radii of curvature about pivot 51, so that bar 48 may pivot freely on pivot 51 in a vertical plane relative to the frame section. The axle 53 of one of the mowing units is secured to pull bar 48 in any suitable manner. Preferably, each end of said pull bar is provided with downwardly extending ears or lugs 54 and the bottom of the notch or recess formed by said lugs 54 is rounded or curved at 55 to receive axle 53 which fits snugly against the bottom face of pull bar 48 throughout the length of the latter. Aligned openings 56 in the ears 54 are adapted to receive bolts 57 which hold axle 53 in position. The axle 53 passes freely at each end between the forked arms 39 of brackets 34 and 35, and carries at each end a ground engaging, driving wheel 58, said wheels 58 being adapted in any suitable manner well known to the art to drive the rotating cutting reels of the mowing unit. The mowing unit is mounted for movement in a vertical plane about pivot 51 relative to the frame section, the axle 53 rotating with pull bar 48 about said pivot and being guided by the engagement of lugs 52 and ribs 40, said axle 53 being prevented from leaving the slots between arms 39 by suitable means such as bolts 59.

As seen in Fig. 1, two mowing units are towed behind the three front mowing units above described in overlapping relation with the latter. Novel means are provided for towing these two mowing units, which means permits independent individual movement of the towed units to conform with the ground conditions, and also maintains said units in proper overlapping position. To these ends the towed units are each connected to the front frame through an individual universal joint, permitting movement of each unit in both vertical and horizontal planes independently of the front frame, and means are provided to constrain the two units to move together in a horizontal plane. Referring now to Figs. 1, 2 and 4, the rear mowing units are towed by means of towing bridles, each comprising three arms or rods meeting substantially in a common point at their forward ends. The two arms 60 and 61 are connected at spaced points to the axle 53 of the mowing unit in any suitable manner. Preferably, however, brackets 63 are clamped on axle 53 by means of bolts 64, and each bracket is provided with a pair of forwardly projecting ears 65 and an upwardly extending ear 66. Arms 60 and 61 of the towing bridle are pivotally connected to ears 65 in any suitable manner as by means of pins 67. Bars 68, each suitably secured at one end to one of the ears 66, as by means of bolts 69, are each connected at the other end by means of bolts 70 with ears 71 formed on a central head 72. Head 72 carries a pair of projecting ears 73, to which arm 62 of the towing bridle is suitably pivoted as by means of pivot pin 74.

The arms 60, 61 and 62 of the towing bridles are connected together at their forward ends by means of brackets 75, each suitably shaped to receive the ends of the three arms of a bridle, and said brackets are connected to the front frame by any suitable type of universal joint. In the form shown, a sleeve 76, mounted on the arm 62 between straps 77 constituting a part of bracket 75, is provided with a lug 78 which is pivoted on a horizontal pin 79 between ears 80 that depend from a circular plate 81 (Figs. 6 and 7). A similar plate 82, to which plate 81 is rotatably connected by means of a central pivot pin or bolt 83, is rigidly connected to the front frame section in any suitable manner, preferably to the rearwardly extending end of cross piece 12 (or 13). Accordingly plate 82 is provided with an upwardly extending portion 84 shaped to form a pocket which is open at the top and at its forward side to receive the end of angle iron 12, said end fitting snugly therein about a block 85 secured to the rear wall of said pocket and being held rigidly therein by means of bolts 86 and 87. Preferably plates 81 and 82 are provided with corresponding openings 88, and a locking pin 89 may be inserted in the openings 88 to prevent relative rotation between said plates.

Each of the rear mowing units is adapted for movement in a vertical plane about pivot pin 79 relative to the front frame, and for movement in a horizontal plane relative to the front frame about the pivot pin 83. Novel means are provided for connecting the rear mowing units so as to maintain them in properly spaced relation at all times. In the form shown, said means comprises an equalizing bar or rod 90 (Fig. 1) connected to rods 62 of the towing bridles by suitable universal joints. Referring to Figs. 1, 4 and 5, each of rods 62 carries a pair of spaced collars 91, which may be secured thereto in any suitable manner, and between said collars is a freely rotatable sleeve 92 provided with a laterally projecting ear 93. Connecting members 94 are pivoted in any suitable manner at 95 to ears 93, the ends of the equalizer rod being inserted in said connecting members and held therein in any suitable manner as by means of a strap 96 and screws or bolts 97. The equalizer bar or rod 90 and each bridle arm 62 are adapted for relative rotation about the axes of rods 62 by means of sleeves 92, and for relative rotation about axes 95 at right angles thereto.

The rear of towed mowing units are thus adapted to swing in a horizontal plane with respect to the front unit, as in the case when the mower is making a turn, so that great flexibility in steering the mower is afforded while at the same time the rear units must always maintain their properly spaced relation due to the equalizer connection 90. It will be seen that a collapsible linkage system is provided, having as two opposite and preferably equal sides the front frame section and the equalizer rod 90 and as the other two preferably equal sides those portions of the rods 62 which are included between the equalizer rod 90 and the universal joints 79, 83. Therefore, while the rear units are quite free to swing from side to side relative to the front frame, they must always swing together since the rods 62 must always be parallel. When making a turn, or on an incline, the tendency of the rear unit on the inside of the turn to swing down the bank into a position in which it might not properly overlap the front units is compensated by the drag of the other rear unit which holds the inside unit in its proper position. This construction affords the greatest flexibility for the mower in steering and in negotiating uneven ground contours and also insures that the mowers will always properly overlap so that no uncut streaks of grass will be left. Moreover, each of the rear mowers is, practically speaking, free for independent movement in a vertical direction, since owing to the universal joints between the corners of the linkage system, the latter can not only be collapsed in one plane, but can be twisted and deformed in practically any direction. Furthermore, when the cutting reels are raised from the ground by any suitable means, such as the lifting levers 98, the mowers can be transported from place to place and steered and handled with great freedom. By means of locking pins 89, the universal joints connecting the towing bridles to the front frame can be locked against rotation about vertical axes, whereby the mower may be backed if desired. The mower may likewise be changed readily from a five unit gang to a three unit gang.

While only one embodiment of the invention has been illustrated in the drawings, it is to be expressly understood that the invention is not limited thereto but is capable of a variety of mechanical expressions, and that changes may be made in the form, details and arrangement of parts without departing from the spirit of the invention. Reference is therefore to be had to the appended claims for a definition of the limits of the invention.

What is claimed is:

1. In a gang mower having a plurality of mowing units, the combination of a front frame for sustaining the draft of certain of said mowing units, a plurality of separate towed mowing units each independently connected to said frame for pivotal movement about right angularly disposed axes, and an equalizing member independent of said frame and pivotally interconnecting said towed units.

2. In a gang mower having a plurality of mowing units, the combination of a front frame having a plurality of said units connected thereto, a plurality of separate towed mowing units each independently connected to said frame at spaced points for universal pivotal movement, and an equalizing member independent of said frame and interconnecting said towed units, said member being connected to said towed units for universal pivotal movement.

3. In a gang mower having a plurality of mowing units, the combination of a front frame for sustaining the draft of certain of said units, a plurality of separate towed mowing units independently connected to said frame at spaced points for universal pivotal movement, and an equalizing member independent of said frame and pivotally connected for universal pivotal movement to said towed units, said member having a length equal to the distance between said points.

4. A gang mower comprising a plurality of mowing units arranged in front and rear rows, a front frame for sustaining the draft of the front units, draft means for each of the rear units each connected to said frame by universal joint means, and means pivotally interconnecting said draft means and constraining the same to substantially similar pivotal movement about their respective universal joint means.

5. A gang mower comprising a plurality of mowing units arranged in front and rear rows, a front frame connected with said front units to draw the same, draft means for each of the rear units, each of said means being connected to said frame by universal joint means, means interconnecting said draft means to cause substantially similar pivotal movement thereof in a horizontal plane, and means for locking said universal joints against movement about their vertical axes.

6. A gang mower comprising a plurality of mowing units arranged in front and rear rows, a front frame for sustaining the draft of the front units, means for towing each rear unit, universal joint means connecting each towing means with said frame, and equalizing means pivotally connected to said towing means and interconnecting the same in a horizontal plane to cause substantially the same pivotal movement of said towing means in said horizontal plane.

7. A gang mower comprising a plurality of mowing units arranged in front and rear rows, a front frame connected to said front units to draw the same, a towing bridle for each rear unit, a universal pivotal connection between each bridle and said frame, and a member independent of said frame and pivotally interconnecting said bridles.

8. A gang mower comprising a plurality of mowing units arranged in front and rear rows, a front frame connected to the front units to draw the same, a quadrilateral linkage having one of its elements formed by said front frame, and means for towing said rear units from said linkage system.

9. A gang mower comprising a plurality of mowing units arranged in front and rear rows, a front frame for sustaining the draft of the front units, a quadrilateral linkage system having one of its elements formed by said front frame, said system having universal pivotal joints at its corners, and means for towing said rear units from said linkage system.

10. A gang mower comprising a plurality of mowing units arranged in front and rear rows, a front frame connected to the front units to draw the same, a parallelogram of pivotally connected links, one of which is constituted by a side of said frame, and means for towing said rear units from said linkage parallelogram.

11. In a gang mower having a plurality of front and rear mowing units, the combination of a front frame connected to said front mowing units to draw the same, a quadrilateral linkage, one element of which is constituted by said frame, and means for towing said rear units from said linkage.

12. A gang mower comprising a plurality of mowing units arranged in front and rear rows, a front frame for sustaining the draft of said front units, a towing bridle universally pivoted to said frame for each rear unit, and an equalizing rod universally pivoted at its ends to said towing bridles.

13. A gang mower comprising a plurality of mowing units arranged in front and rear rows, a front frame for sustaining the draft of said front units, a towing bridle of tripod shape for each rear unit, means for universally pivoting each bridle at its apex to the front frame, means connecting the legs of each bridle to a rear unit, and an equalizer rod extending between the bridles and universally pivoted to one leg of each bridle.

14. In a gang mower, the combination of a frame, a pair of brackets mounted thereon in spaced relation, guide means on the outer opposite sides of the brackets respectively, a pull bar pivoted on the frame to rotate about a horizontal axis located between the brackets, means on the opposite ends of the pull bar embracing the brackets and engaging the exteriorly disposed guide means thereon, and means for connecting the axle of a mowing machine unit to the pull bar to move therewith about said axis and draw said unit.

15. In a gang mower, the combination of a mowing unit and a frame, a pair of brackets depending from the frame in spaced relation and having forked portions between which the axle of the mowing unit extends, a member depending from the frame between the brackets and carrying a pivot element, a pull bar rotatably mounted on the pivot element and having opposite ends formed to embrace said brackets and slide on the exterior surfaces thereof when the pull bar is rotated about said pivot element, and means for securing the axle of the mowing unit to the ends of said pull bar.

16. In a gang mower, the combination of a mowing unit and a frame, a pair of brackets mounted on the frame in spaced relation and having forks between the arms of which the axle of the mowing unit extends, guide means on the outer opposite sides of the fork arms respectively, a pull bar pivoted on the frame between the brackets and having opposite ends each formed with spaced lugs embracing said axle and said brackets and engaging said guide means, and means for retaining the axle in position between said lugs.

17. In a gang mower, the combination of a mowing unit and a frame, ground engaging means for supporting said frame, a pair of brackets depending from said frame and having their lower portions curved about a center intermediate said brackets, said curved lower portions being slotted and having external ribs curved about said center, a pivot member carried by said frame at said center, a pull bar rotatably mounted on said pivot member having its ends rotating between said brackets, said ends being provided with lugs embracing the slotted portions of said brackets and engaging said ribs, and means for connecting the axle of a mowing unit to said pull bar, said axle passing freely through the slotted portions of said bracket and carrying ground engaging wheels.

18. In a gang mower, the combination of a frame, a plurality of members each connected to said frame for movement about a vertical axis, a plurality of towing bridles each connected to one of said members for movement about a horizontal axis, a plurality of mowing units each connected to one of said bridles, an equalizing member pivotally interconnecting said bridles, and means for locking each of said first named members against movement about a vertical axis.

19. In a gang mower, the combination of a frame, a plate rigidly mounted thereon, a second plate rotatably mounted on said first plate, said plates having similarly disposed openings, a locking pin adapted to enter said openings, a mowing unit, and means for towing said unit pivotally connected to said second plate.

20. In a gang mower, the combination with a frame and a mowing unit, of a pair of brackets mounted on the frame in spaced relation and having forks between the arms of which the axle of the mowing unit extends, a pull bar pivoted on the frame between said brackets and having opposite ends each formed with lugs embracing said forks and said axle, and means for retaining the axle in position between said lugs.

21. In a gang mower, the combination with a frame and a mowing unit, of a pair of brackets mounted on the frame in spaced relation and having forks between the arms of which the axle of the mowing unit extends, a pull bar pivoted on the frame between said brackets and having opposite ends each provided with a pair of lugs embracing the arms of one fork and a pair of lugs embracing said axle, and means for retaining the axle in position between the lugs that embrace the same.

22. In a gang mower, the combination with a front frame for sustaining the draft of a plurality of mowing units, of a plurality of separate towed mowing units, a plurality of devices independently connecting the towed mowing units with said frame for movement about right angularly disposed axes, an equalizing member independent of the frame and extending rearwardly thereof in parallel relation therewith, and universal pivotal connections between the equalizing member and said towed mowing units.

23. In a gang mower, the combination with a front frame for sustaining the draft of a plurality of mowing units, of a plurality of separate towed mowing units, means independently connecting the towed mowing units with the front frame and providing for pivotal movement of said towed mowing units about right angularly disposed axes, and an equalizing member independent of the front frame pivotally interconnecting the towed mowing units and maintaining them in proper relation during their rectilinear and pivotal movements.

24. In a gang mower, the combination with a front frame for sustaining the draft of a series of mowing units, of a plurality of separate towed mowing units, a plurality of devices independently connecting the towed mowing units with said frame and providing for lateral and vertical swinging motion of said towed mowing units, an equalizing member independent of the front frame and extending rearwardly thereof in parallel relation therewith, and means pivotally connecting the equalizing member with the towed mowing units.

25. In a gang mower, the combination with a front frame for sustaining the draft of a plurality of mowing units of a plurality of separate towed mowing units, a plurality of independent devices mounted on the front frame in spaced relation and each comprising two interconnected parts movable about axes extending at right angles to each other respectively, a plurality of separate means each connecting one towed mowing unit with a part of one of said devices, and an independent element extending in spaced relation with the front frame and pivotally connected with said plurality of means.

26. In a gang mower, a plurality of front mowing units, a front frame sustaining the draft thereof and having end pieces portions of which project rearwardly from the frame, a plurality of separate towed mowing units, a plurality of devices mounted on and depending from the rearwardly projecting portions of said end pieces and each comprising two interconnected parts movable about axes extending at right angles to each other respectively, a plurality of separate bridles each connecting one towed mowing unit with a part of one of said devices, and an independent element extending in spaced relation with the front frame and pivotally connected with said plurality of bridles.

27. A gang mower comprising a plurality of mowing units arranged in front and rear rows, a front frame connected to the front mowing units, a quadrilateral linkage system one side element of which is formed by said front frame and has universal pivotal connections with the end elements of the linkage system, and means for towing the rear mowing units from said linkage system.

28. A gang mower comprising a plurality of mowing units arranged in front and rear rows, a front frame connected to the front mowing units, a quadrilateral linkage system comprising a side element and end elements having universal pivotal connections and an opposite side element formed by said front frame and having universal pivotal connection with said end elements, and means for towing the rear mowing units from said linkage system.

29. A gang mower comprising a plurality of mowing units arranged in front and rear rows, a front frame connected to the front mowing units, a quadrilateral linkage system comprising a side element formed by said front frame and an opposite side element having pivotal connections with the end elements of the system, universal pivotal connections between the first named side element and said end elements, and towing means connecting the rear mowing units with parts of said universal connections.

In testimony whereof I have signed this specification.

HARRY R. LONTZ.